United States Patent
Won et al.

(10) Patent No.: US 8,080,911 B2
(45) Date of Patent: Dec. 20, 2011

(54) SPHERICAL MOTOR ROTATING IN MULTIPLE DEGREES OF FREEDOM

(75) Inventors: Sung Hong Won, Gyeonggi-do (KR); Dong Woo Kang, Seoul (KR); Ju Lee, Seoul (KR)

(73) Assignee: ICUF-HYU (Industry-University Cooperation Foundation Hanyang University), Seoul (KR)

( * ) Notice: Subject to any disclaimer, the term of this patent is extended or adjusted under 35 U.S.C. 154(b) by 526 days.

(21) Appl. No.: 12/252,712

(22) Filed: Oct. 16, 2008

(65) Prior Publication Data
US 2009/0230787 A1    Sep. 17, 2009

(30) Foreign Application Priority Data
Feb. 29, 2008    (KR) .................. 10-2008-0019084

(51) Int. Cl.
*H02K 7/06* (2006.01)
(52) U.S. Cl. .................. 310/80; 310/254.1; 310/261.1
(58) Field of Classification Search .............. 310/80, 310/261, 254, 40 R, 68 B, 38
See application file for complete search history.

(56) References Cited

U.S. PATENT DOCUMENTS

| | | | |
|---|---|---|---|
| 4,739,241 A * | 4/1988 | Vachtsevanos et al. | 318/568.19 |
| 6,906,441 B2 * | 6/2005 | Mendenhall | 310/112 |

* cited by examiner

*Primary Examiner* — Quyen Leung
*Assistant Examiner* — Leda Pham
(74) *Attorney, Agent, or Firm* — Kinney & Lange, P.A.

(57) ABSTRACT

A spherical motor rotating in multi degrees of freedom has a reliable capability of determining positioning. The spherical motor includes a hollow spherical-shaped stator installed with a bi-level bobbin wound by coil generating a synthesized magneto-motive force on an inner surface thereof; and a rotor formed inside the stator and rotating around a shaft, wherein a slope of the shaft is adjusted by the synthesized magneto-motive force. Two or more of the bobbins are provided and installed at regular intervals along the inner surface of the stator, and the rotor includes one or more permanent magnets. The spherical motor rotating in multi degrees of freedom, formed with the above mentioned figures, can embody multi degrees of freedom by the interaction between the flowing current in the winding coil around the bobbin and the permanent magnet.

17 Claims, 17 Drawing Sheets

SPHERICAL MOTOR ROTATING IN MULTIPLE DEGREES OF FREEDOM

BACKGROUND OF THE INVENTION

1. Field of the Invention

The present invention relates to a spherical motor, and more particularly, to a spherical motor rotating in multiple degrees of freedom, wherein the rotor has a reliable capability to determine positioning.

2. Description of the Related Art

The term "humanoid" normally refers to a robot resembling a human, which has locomotive organs moving like those of the human, sense organs resembling those of the human, and intellectual organs capable of deciding, thinking, and feeling like a human.

Technologies related to the humanoid have been developed in the direction of realizing the humanoid's actions more smoothly so that they more closely resemble those of a human and enhancing the efficiency of the machineries by minimizing the size of the components. Especially, as the motor is the most important component among those which are in charge of the locomotive organs, a new motor with new degrees of freedom is needed to achieve the minimization and the high efficiency in addition to the smooth movements breaking away from the conventional characteristic of one degree of freedom.

FIG. 13 is a perspective view illustrating a drive system of the prior art to realize multiple degrees of freedom movement.

As illustrated in FIG. 13, the drive system of the prior art has a multi-frame structure and each frame is connected with a motor to generate power. This drive system needs to use a plurality of motors to realize the multi-degrees of freedom of movements. Consequently, there is a limit because weight and volume several fold larger than the drive system of one degree of freedom are needed to generate the desired output.

Robot's joint regions such as the arm, wrist, shoulder, and pelvis have a very complicated drive mechanism since multi-drive systems in multi degrees of freedom need to be intensively embodied at each connecting point, and the overall robot's size becomes bigger to secure enough space for installing a plurality of motors therein.

A spherical motor can be broadly used to solve this kind of problem. FIG. 14 is a perspective view illustrating a frame of a normal spherical motor, FIG. 15 is a schematic view showing coils and a rotor of the normal spherical motor, and FIG. 16 is a diagram illustrating the resultant torque by a synthesized magneto-motive force between the coil and the permanent magnet of the normal spherical motor.

The supporting frame of the spherical motor can eliminate the limit to the slope of a rotating shaft when it is structured with a spherical bearing and a round rotor. However, a framed embodiment with the supporting structure will be described below as illustrated in FIG. 14 for the purposes of understanding the invention and convenient description.

As shown in FIG. 14, a supporting structure of the spherical motor having three degrees of freedom includes more than two rotatable frames 3 and 5 like a gyroscope, and the spherical motor formed with a stator 10, a rotor 20, and a shaft 30 is supported inside the frames 3 and 5.

As illustrated in FIG. 15, the spherical motor 1 supported inside the frames 3 and 5 includes the stator formed as a hollow sphere; the rotor 20 rotatably installed in the stator 10; and the shaft 30 which is a center axle and transmits the rotating power to the outside. The three degrees of freedom of movement of the rotor 20 are possible since a plurality of coils 12 and 14 is dispersed on the inner surface of the stator 10.

The shaft 30 can be inclined in any direction because the permanent magnets 22 are formed at the opposing sides of the rotor 20.

As will be described in detail below, six coils 12 and 14 are respectively arranged on the top portion and bottom portion of the inner surface of the stator 10 at regular intervals and controlled by the 12-channels of current source. The rotor 20 is formed in a "+" shape and four permanent magnets 22 are installed at each end, and permanent magnets 22 can only turn on the shaft 30 since they are fixed on the shaft although they can rotate in any direction.

The coils 12 and 14 formed on the inner surface of the stator 10 are the electromagnets distanced from the permanent magnets 22 at regular air gaps. The electric current circulated into the coils 12 and 14 generates a synthesized magneto-motive force, which positions the location of the electromagnets. The rotor 20 as well as the permanent magnet 22 can be rotated or be inclined in any direction according to the location of the coils 12 and 14. In other words, the rotor 20 can be rotated and inclined in the desired direction if the current value into each coil 12 and 14 can be properly controlled. It is understood that the rotation and position determination of the rotor 20 can be much affected by the coil 12 and 14 of the stator 10.

Referring to FIGS. 15 and 16, the synthesized magneto-motive force between the coil 12 and 14 and the permanent magnets 22 located inside the spherical motor 1 as above mentioned will be described below.

As described in FIGS. 15 and 16, the corresponding torques to the magneto-motive force by the coil 12, (hereinafter, referred to as 'upper coil') installed on the upper inner surface of the stator 10 on the basis of 'X-Y plane' will be graphed as the first line 42 and the corresponding torques to the magneto-motive force by the coil 14, (hereinafter, referred to as 'bottom coil') installed on the bottom inner surface of the stator 10 will be graphed as a second line 44. At this time, the resultant torque like a synthesized third line 46 from the first line 42 and the second line 44 will be shown since the magneto-motive forces by the upper coil 12 and the bottom coil 14 are working together.

If the slope of the resultant torque is a positive (+) sign in the region of drawing number 48, it means that it will easily rotate into the positive direction from the current position when an external force is applied; and if the slope of the resultant torque is a negative (-) sign, it means that it will return to the current position even though an external force is applied. Since the slope of the resultant torque in the spherical motor 1 is a positive, it is understood that it has an unstable position determination.

In order to get a stable position determination of the rotor 20, the slope of the resultant torque by the coil 12 and 14 needs to be a negative (-). For this job, more numbers of coils than those illustrated in FIG. 15 are used or the weight of the central axis needs to be corrected. However, when more numbers of coils are used, the control system to control the flowing current in each coil can be complicated and the number of the drive system needs to be increased. When the weight of the central axis is corrected, an extra space for the balance weight is needed.

FIG. 17 is a perspective view illustrating the permanent magnets of the rotor and some parts of the coils in order to describe the generation principle of the synthesized magneto-motive force in the normal spherical motor, and FIG. 18 is a diagram showing the changes of the resultant torque by the synthesized magneto-motive force according to the coil position of the normal spherical motor.

When the upper coil 12 and the bottom coil 14 move in the A1 direction and the B1 direction so that the angle formed by the center of the magneto-motive force from the upper coil 12 and the center of the magneto-motive force from the bottom coil 14 is getting smaller, the peak of the corresponding torque 42 to the magneto-motive force by the upper coil 12 is moving in the A2 direction and the peak of the corresponding torque 44 to the magneto-motive force by the bottom coil 14 is moving in the B2 direction as illustrated in FIG. 18. Consequently, the slope of the resultant torque changes from positive (+) to negative (−) and arrives at the stable position determination.

However, there is a limit of decreasing the angle between the center of the magneto-motive forces by each coil 12 and 14 when the upper coil 12 and the bottom coil 14 are located in the same level.

SUMMARY OF THE INVENTION

The present invention resolves the aforesaid problems, and embodiments of the present invention provide a spherical motor rotating in multiple degrees of freedom in order to minimize the size of a robot and be capable of the natural movements by applying it to the position needed for the multiple degrees of freedom movement.

Embodiments of the present invention also provide a spherical motor rotating in multiple degrees of freedom, wherein a stable positioning torque can be achieved via a relatively simple control system by equipping a bi-level bobbin therein.

In an exemplary embodiment of the present invention, the spherical motor rotating in multi degrees of freedom includes a hollow spherical-shaped stator installed with a bi-level bobbin wound by coil generating a synthesized magneto-motive force on the inner surface thereof; and a rotor formed inside the stator and rotating around a shaft, wherein a slope of the shaft is adjusted by the synthesized magneto-motive force. Two or more of the bobbins are provided and installed at regular intervals along the inner surface of the stator, and the rotor includes one or more permanent magnets.

The spherical motor rotating in multi degrees of freedom, formed as described above, can embody multi degrees of freedom by the interaction between the current in the winding coil flowing around the bobbin and the permanent magnet.

Concurrently, the structure of the bobbin includes a first bobbin segment and a second bobbin segment formed with an inner layer winding member and an outer layer winding segment, respectively, wherein the outer layer winding member of the first bobbin segment is longer than the inner layer winding member, the inner layer winding member of the second bobbin segment is formed longer than the outer layer winding member, and the first bobbin segment and the second bobbin segment are piled up one on the other. The center of the magneto-motive force is changed according to the turns of the winding coil on the first level and the turns of the winding coil on the second level. The center of the magneto-motive force by the coil wound on the first level and the center of the magneto-motive force by the coil wound on the second level does not exceed the critical angle.

Since the spherical motor rotating in multi degrees of freedom in accordance with the present invention can realize the multi degrees of freedom movement by using the interaction between the current in the winding coil flowing around the bobbin and the permanent magnet, the spherical motor can be used for the robot's joints (components needed for the multi degrees of freedom movement) including a humanoid. The spherical motor rotating in multi degrees of freedom in accordance with the present invention can accomplish the smooth movement, the minimization, and the high efficiency of the joints. Besides, the positioning torque can be stably achieved via the relatively simple control system by equipping the bi-level bobbin. In order to make the center of the magneto-motive force by the upper coil and the center of the magneto-motive force by the bottom coil not exceed the critical angle, the bobbin, on which the coil is wound, can be designed into a bi-level structure, so that the torque for the positioning determination can be adjusted by changing the turns of the winding coil on each level.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention will now be described more fully hereinafter with reference to the accompanying drawings, in which preferred embodiments thereof are shown.

Figure 1:
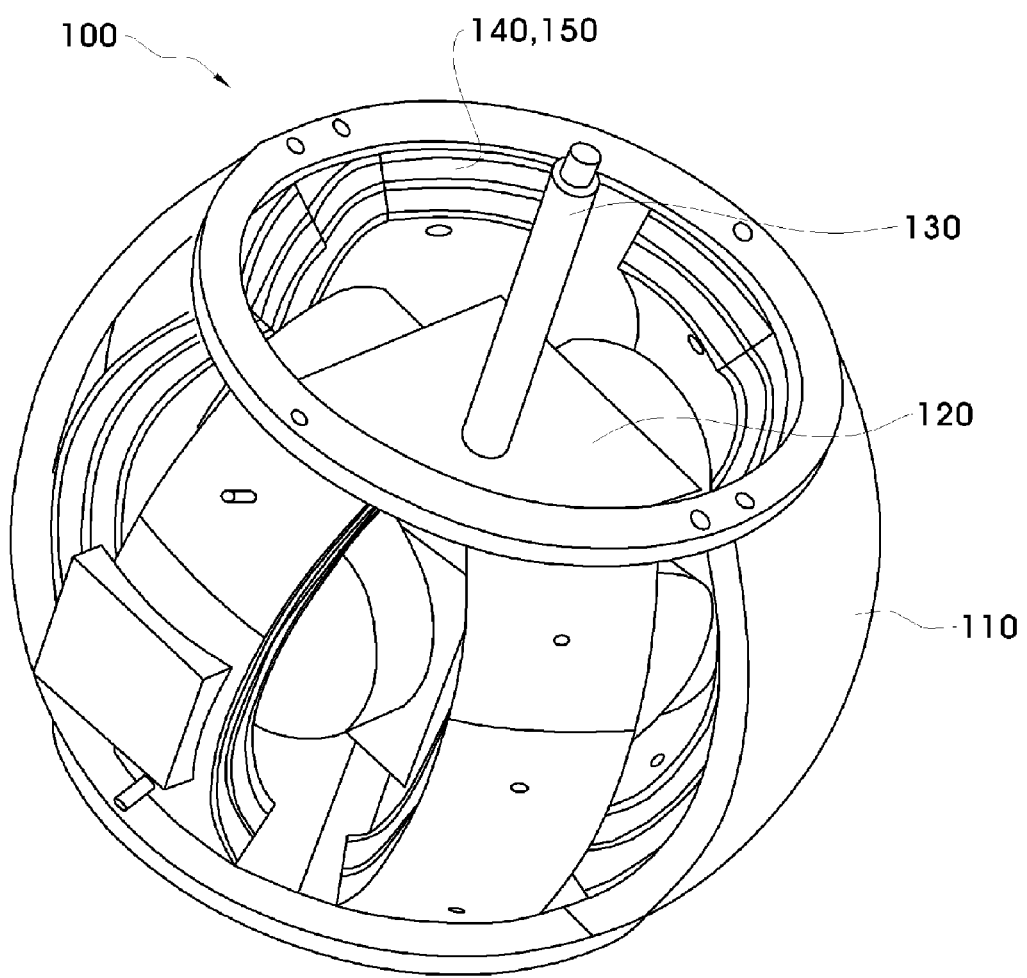
FIG. 1 is a perspective view illustrating a first embodiment of a spherical motor rotating in multi degrees of freedom in accordance with the present invention.
Figure 2:
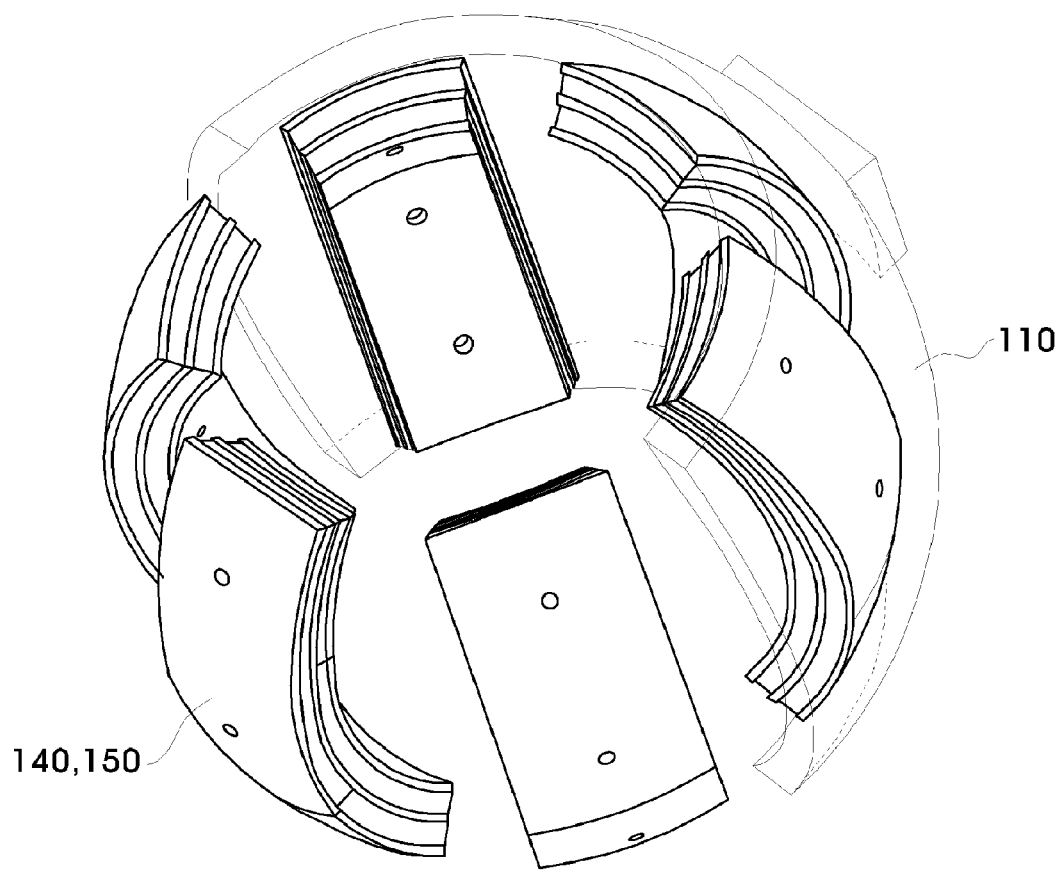
FIG. 2 is a perspective view illustrating a stator and a bobbin of the first embodiment of the spherical motor rotating in multi degrees of freedom in accordance with the present invention.
Figure 3:
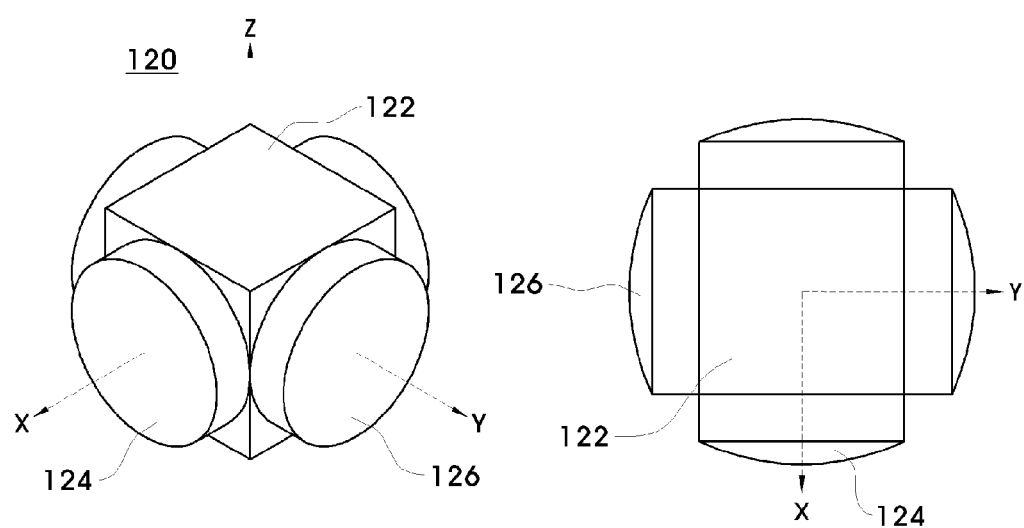
FIG. 3 is a perspective view illustrating a rotor of the first embodiment of the spherical motor rotating in multi degrees of freedom in accordance with the present invention.

FIG. 1 is a perspective view illustrating a first embodiment of a spherical motor rotating in multi degrees of freedom in accordance with the present invention, and FIGS. 2 and 3 are perspective views illustrating a stator, bobbins, and a rotor of the first embodiment of the spherical motor rotating in multi degrees of freedom in accordance with the present invention.

As illustrated in FIGS. 1 to 3, the spherical motor rotating in multi degrees of freedom 100 in accordance with the present invention includes the stator 110 coupled with the bi-level bobbins 140 and 150 wound by coils generating a synthesized magneto-motive force; and the rotor 120 formed inside the stator 110 and rotating around a shaft 130 the slope of which can be adjusted by the synthesized magneto-motive force.

The stator 110 is formed as a hollow spherical shape to accommodate the rotor 120. Here, a sphere is defined as a portion of a full globe-shape and includes less than a hemisphere. Some part of the stator 110 can be opened in order for the shaft 130 of the rotor 120 to incline in any direction. A plurality of by-level bobbins 140 and 150 are dispersed on the inner surface of the stator 110. These bobbins 140 and 150 can be dispersed at regular intervals along the inner surface of the stator 110. For example, six, twelve, or twenty four of the bi-level bobbins 140 and 150 can be dispersed at regular intervals.

In FIG. 3, the rotor 120 includes a rotor core 122, the shaft 130 piercing through the rotor core 122 and transmitting the turning force, and permanent magnets 124 located at the opposing both sides of the rotor core 122 around the shaft 130. The permanent magnets 124 are generally made of Nd, and their numbers can be one, two, four, or six. The rotor 120 can additionally include pole shoes 126 acting as a passage by externally forming an air gap between the stator 110 and the rotor 120 and internally supporting the permanent magnets 124.

Figure 4:
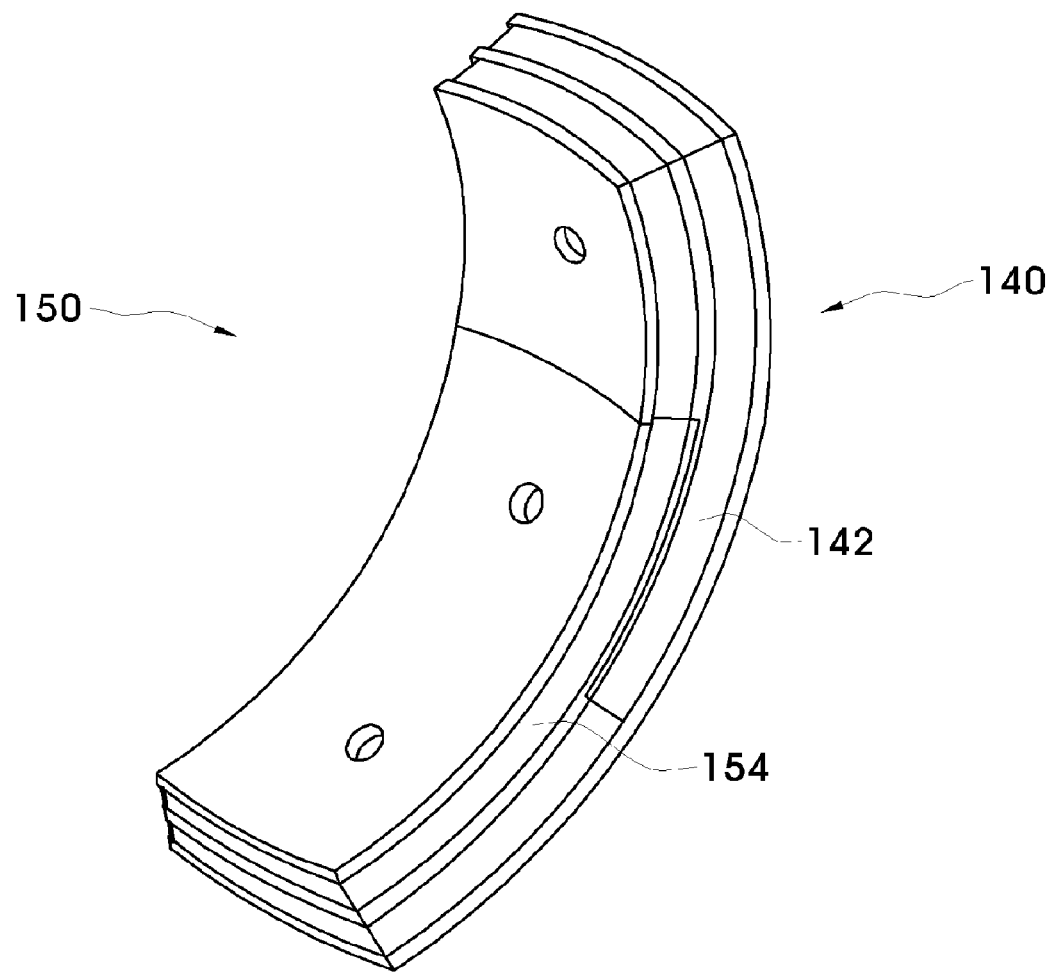
FIG. 4 is a perspective view illustrating a bi-level bobbin of the first embodiment of the spherical motor rotating in multi degrees of freedom in accordance with the present invention.
Figure 5:
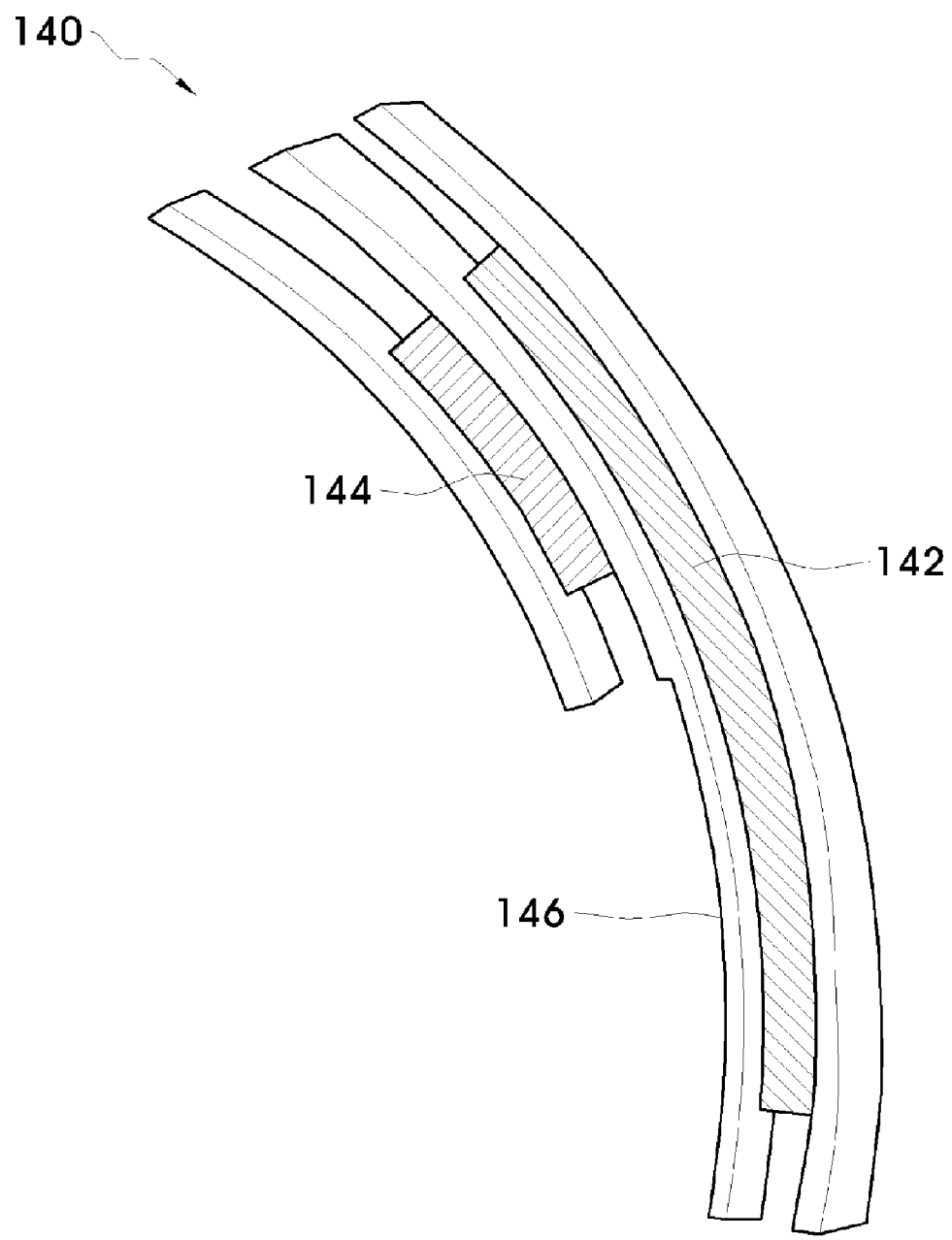
FIG. 5 is a perspective view illustrating a first bobbin segment in the bi-level bobbin in accordance with the present invention.
Figure 6:
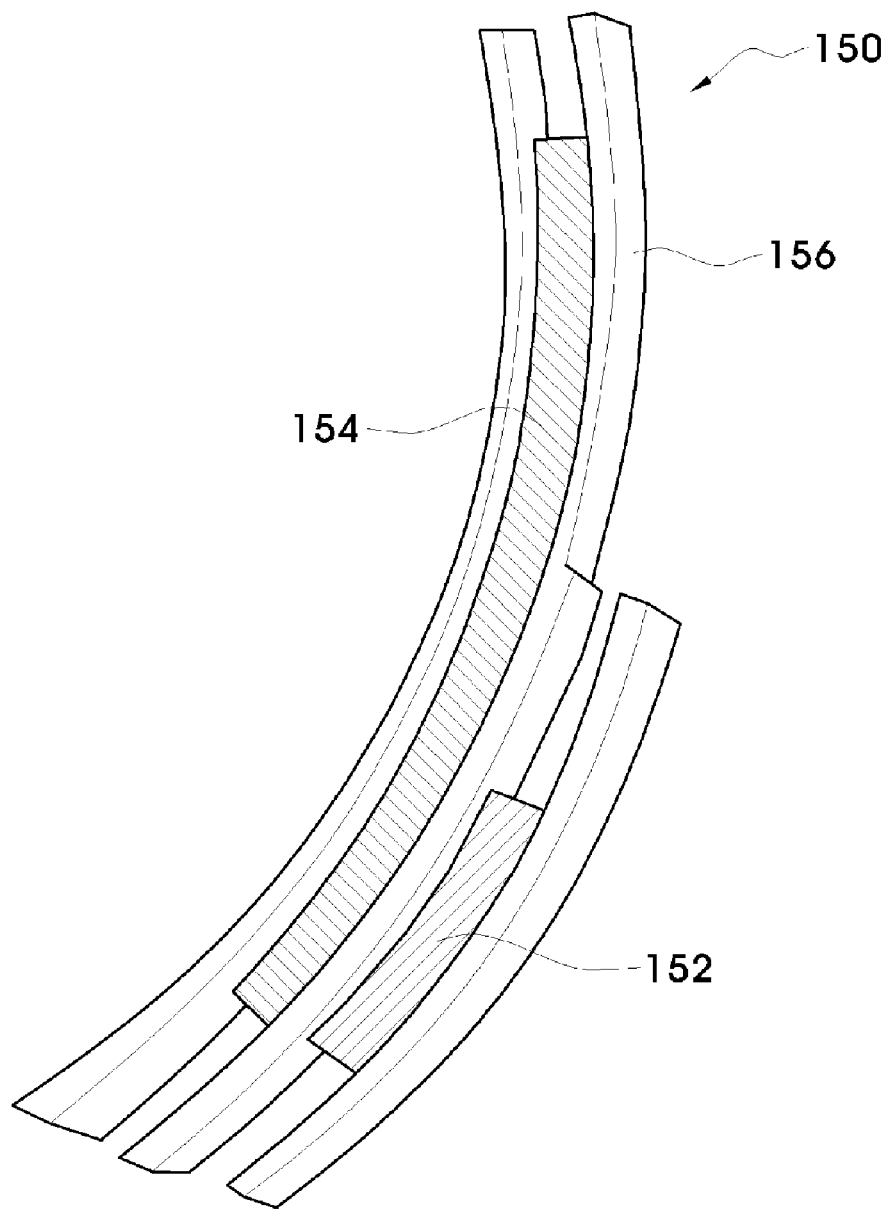
FIG. 6 is a perspective view illustrating a second bobbin segment in the bi-level bobbin in accordance with the present invention.

FIG. 4 is a perspective view illustrating the bi-level bobbin of the first embodiment of the spherical motor rotating in multi degrees of freedom in accordance with the present invention, and FIGS. 5 and 6 are perspective view illustrating a first bobbin segment and a second bobbin segment in the bi-level bobbin in accordance with the present invention.

Referring to FIGS. 4 to 6, the bi-level bobbin 140 and 150 includes the first bobbin segment 140 and the second bobbin segment 150. The first bobbin segment 140 is structured with the outer layer winding member 142 and the inner layer winding member 144, and the second bobbin segment 150 is structured with the outer layer winding member 152 and the inner layer winding member and 154. The outer layer winding member 142 of the first bobbin segment 140 and the inner layer winding member 154 of the second bobbin segment 150 are elongated and piled up one on another.

In FIG. 5, the first bobbin segment 140 is a bi-level structure formed with the first outer layer winding member 142 and the first inner layer winding member 144; is curved so as to stick on the inner surface of the spherical stator 110 in FIG. 1; and is formed as an upside down shape of "L" letter. A coil is wound around the first outer layer winding member 142 and the first inner layer winding member 144 in order to generate the magneto-motive force when the electric current flows into it. The first outer layer winding member 142 is elongated a little longer than the first inner layer winding member 144, and the first inner layer winding member 144 is located at the inside of the first outer layer winding member 142.

In FIG. 6, the second bobbin segment 150 is a bi-level structure formed with the second outer layer winding member 152 and the second inner layer winding member 154, which are similar to the first bobbin segment 140; further, it is formed in a curved "L" shape so as to stick on the inner surface of the spherical stator (110 in FIG. 1). A coil is wound around the second outer layer winding member 152 and the second inner layer winding member 154 in order to generate the magneto-motive force when the electric current flows into it. The second inner layer winding member 154 is elongated a little longer than the second outer layer winding member 152, and the outer layer winding member 154 is located at the outside of the second inner winding member 154.

As shown in FIG. 4, since the first bobbin segment 140 and the second bobbin segment 150 are in an upside down "L" letter shape and an "L" shape, they are coupled as a bi-level structure by forming the outer layer with the first outer layer winding member 142 and the second outer layer winding member 152, and by forming the inner layer with the first inner layer winding member 144 and the second inner layer winding member 154. As will be described in detail below, the surface to which the first inner layer winding member 144 in the inner surfaces of the first outer layer winding member 142 of the first bobbin segment 140 is not attached and the surface to which the second outer layer winding member 152 in the outer surface of the second inner layer winding member 154 of the second bobbin segment 150 is not attached are coupled by facing each other. The first bobbin segment 140 and the second bobbin segment 150 can include the coupling member 146 and 156 respectively, and each coupling member 146 and 156 can be easily coupled when a guide (not shown) is prepared.

The spherical motor 100 formed with the aforesaid structures in accordance with the present invention is constructed as a partially double-layered structure with the first outer layer winding member 142 and the second inner layer winding member 154. The angle among the centers of the magneto-motive force by the winding coils around each winding member 142, 144, 152 and 154 can be smaller than the angle of the center of the magneto-motive force by the two coils with single layered structure. Consequently, the slope of the resultant torque by the synthesized magneto-motive force will be a negative (−) value and a stable positioning determination can be obtained. At this time, the angles among the centers of the magneto-motive force by the winding coils around each winding member 142, 144, 152 and 154 do not exceed the critical angle. The critical angle means the angle where the slope of the resultant torque is changing from the positive (+) to the negative (−).

Meanwhile, the first bobbin segment 140 and/or the second bobbin segment 150 can be made of synthetic resin and, of course, the first bobbin segment 140 and the second bobbin segment 150 can be formed as one body.

Figure 7:
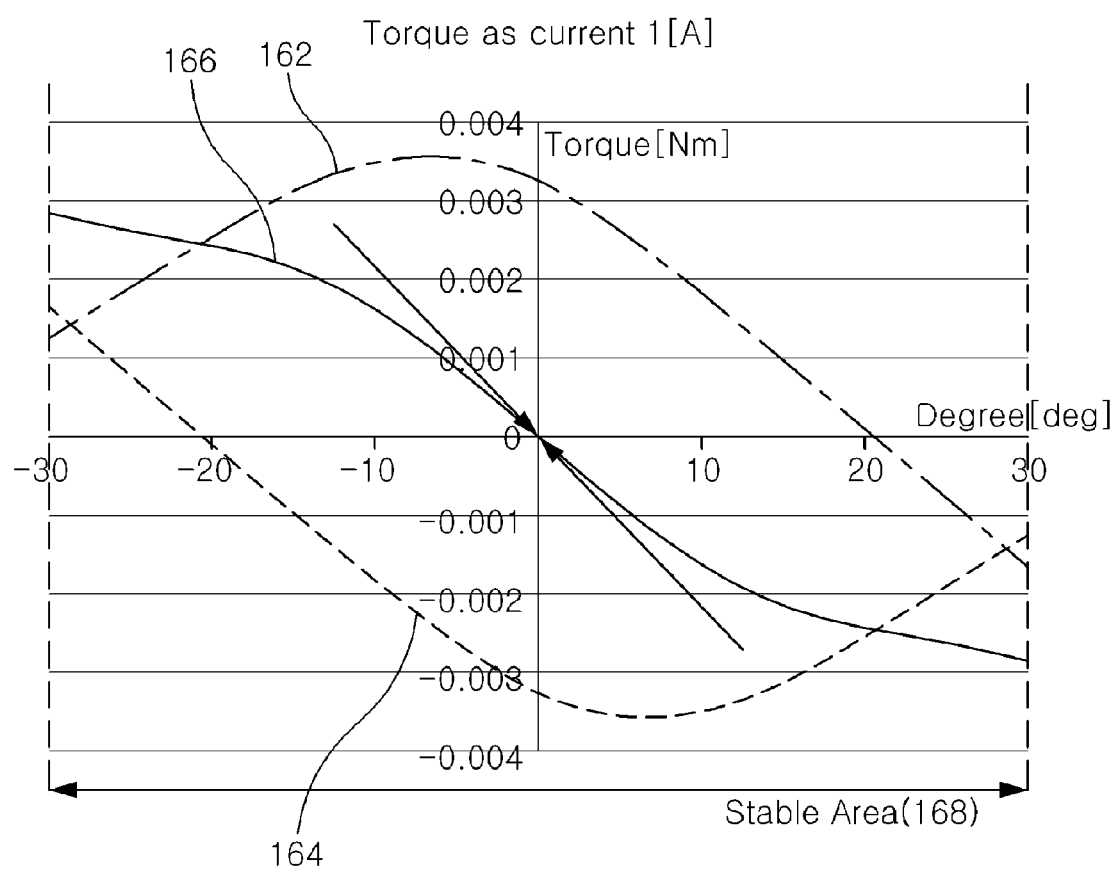
FIG. 7 is a diagram showing a synthesized magneto-motive force between the coil and the permanent magnet of the first embodiment of the spherical motor rotating in multi degrees of freedom in accordance with the present invention.

FIG. 7 is a diagram showing a synthesized magneto-motive force between the coil and the permanent magnet of the first embodiment of the spherical motor rotating in multi degrees of freedom in accordance with the present invention.

In FIG. 7, the first curve designates the torque corresponding with the magneto-motive force by the first bobbin segment (140 in FIG. 4), and the second curve designated the torque corresponding with the magneto-motive force by the second bobbin segment (150 in FIG. 4). And the third curve 166 designates the torque corresponding with the synthesized magneto-motive force by the two above mentioned magneto-motive forces.

As illustrated in FIG. 7, it is understood that the slope of the resultant torque has a stable positioning determination since the slope of the resultant torque is a negative (−) in the area of the drawing number 168. For the positioning determination, a user can secure a desired level of stability by changing the first curve 162 and the second curve 164 when the turns of the winding coil in the first outer layer winding member 142 of the first bobbin segment 140 and the first inner layer winding member 144 and the turns of the winding coil in the second outer layer winding member 152 of the second bobbin segment 150 and the second inner layer winding member 154 can be adjusted.

According to the present invention, there is an advantage of saving production cost of the motor by reducing the numbers of the necessary components for the product vis-a-vis embodying one degree of freedom, two degrees of freedom, or three degrees of freedom with a motor capable of multi degrees of freedom movement. One motor can be used for the complicated movements and the generating power per weight can be enhanced consequently. By reducing the errors from the power conversion devices for the multi degrees of freedom, accurate control can be possible and is easy since the shaft for each direction is concentrated at one point. The minimization and the high efficiency for the whole system can be possible since one motor can embody the whole space for the multiple motors.

Figure 8:
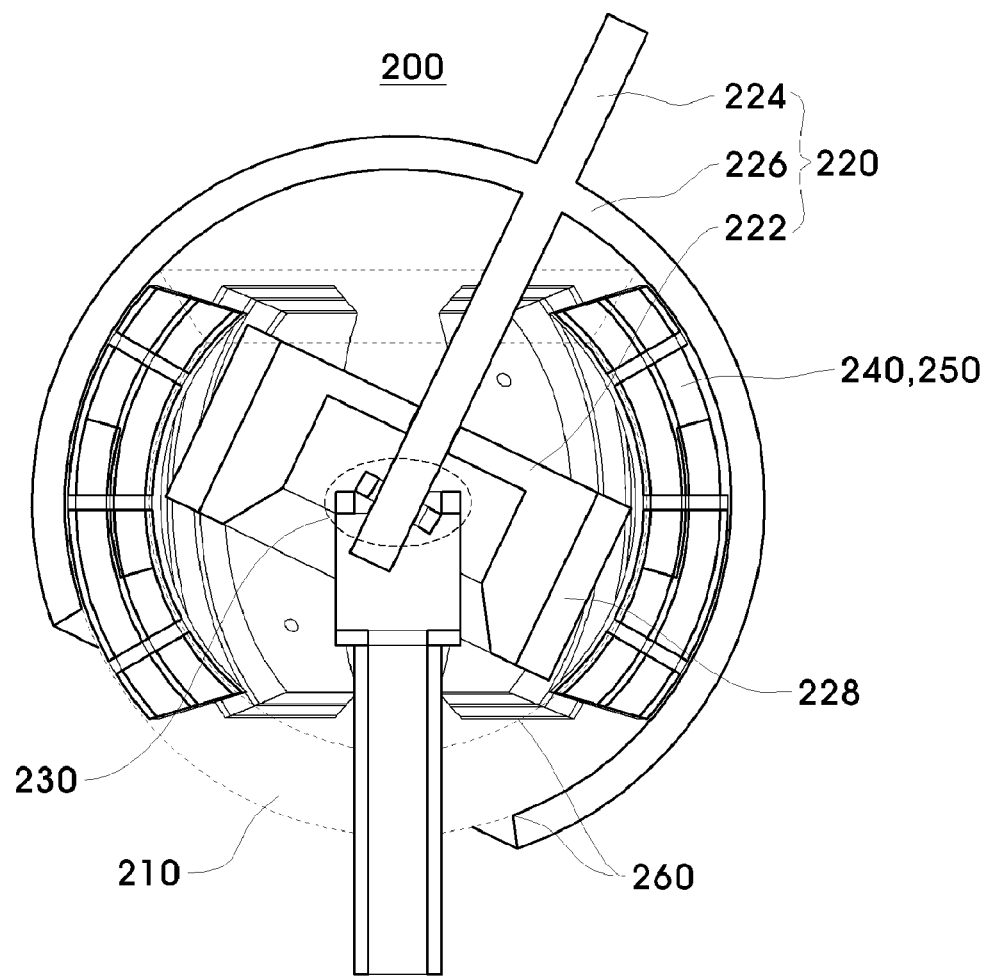
FIG. 8 is a perspective view illustrating a second embodiment of the spherical motor rotating in multi degrees of freedom in accordance with the present invention.
Figure 9:
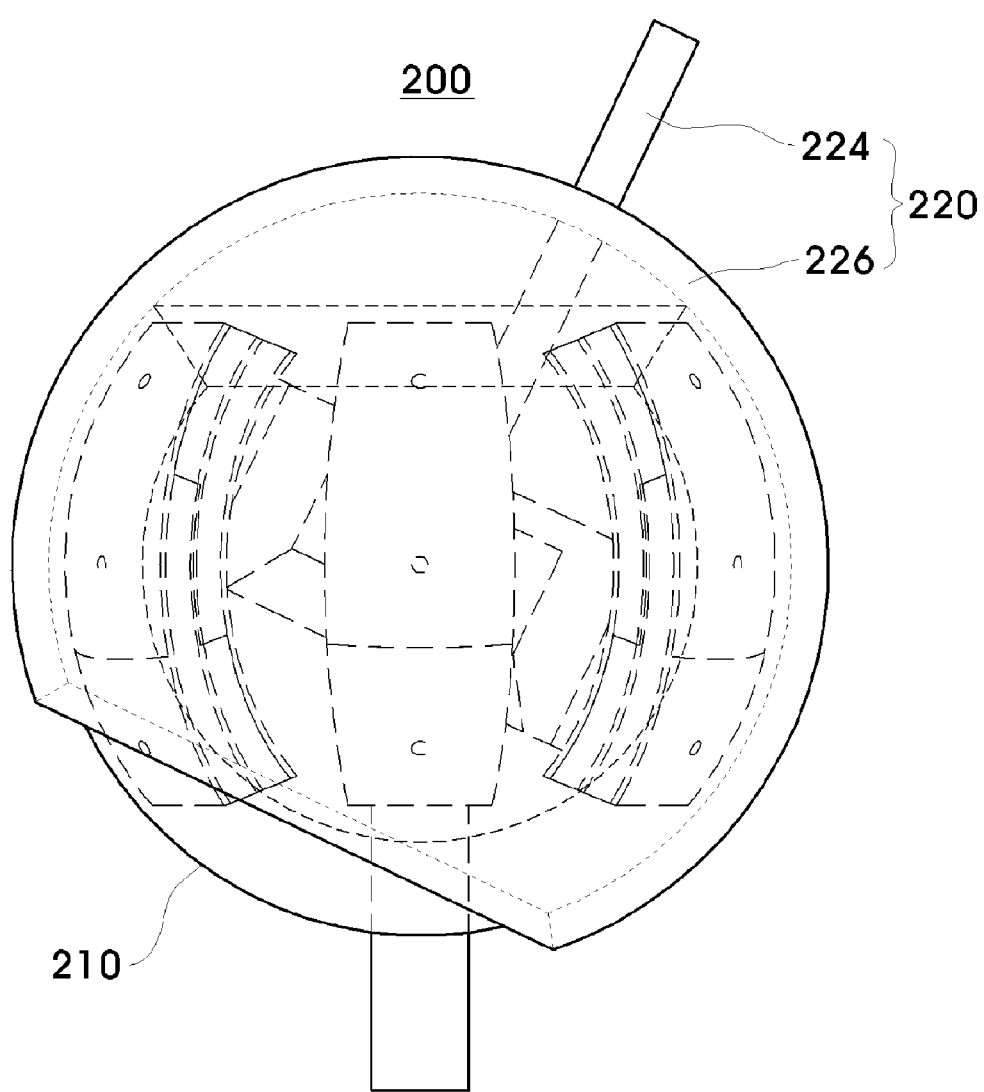
FIG. 9 is a perspective view showing one side of the second embodiment of the spherical motor rotating in multi degrees of freedom in accordance with the present invention.
Figure 10:
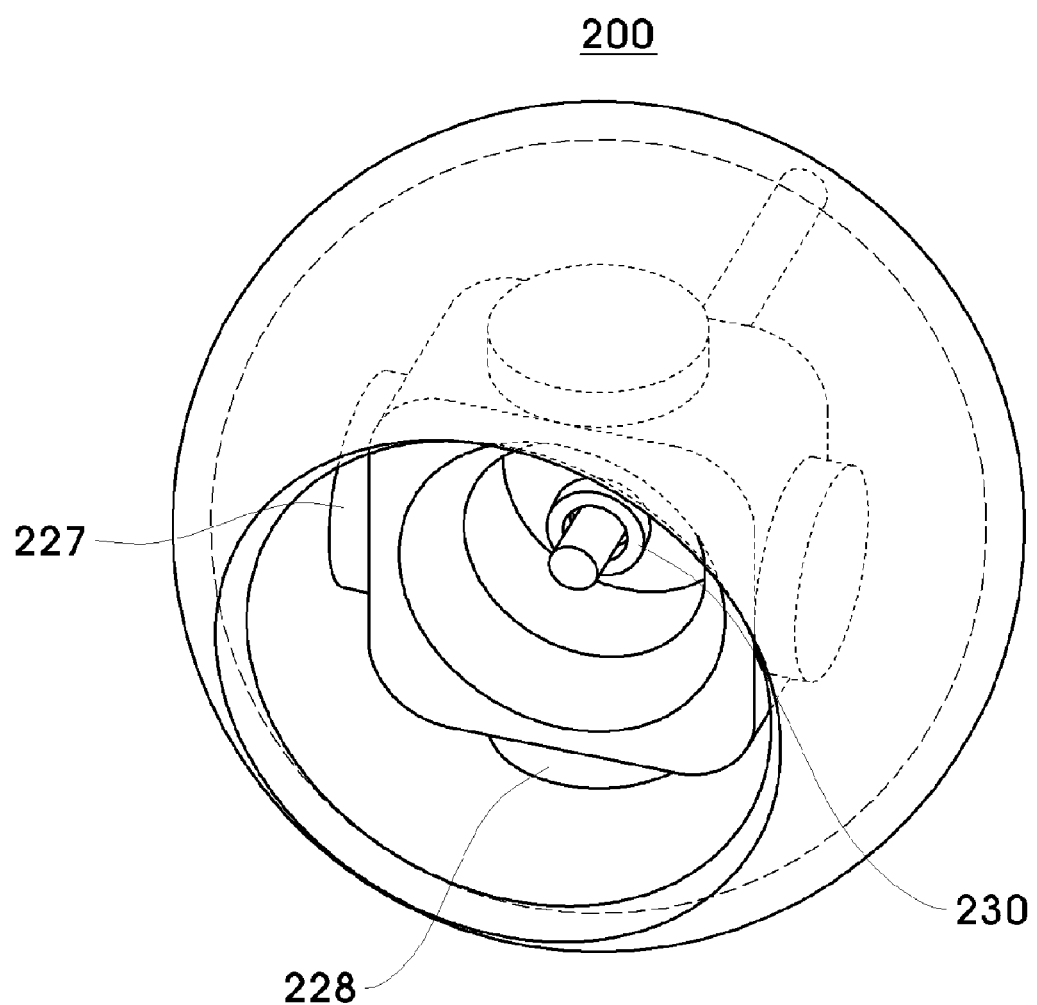
FIG. 10 is a perspective view showing the other side of the second embodiment of the spherical motor rotating in multi degrees of freedom in accordance with the present invention.
Figure 11:
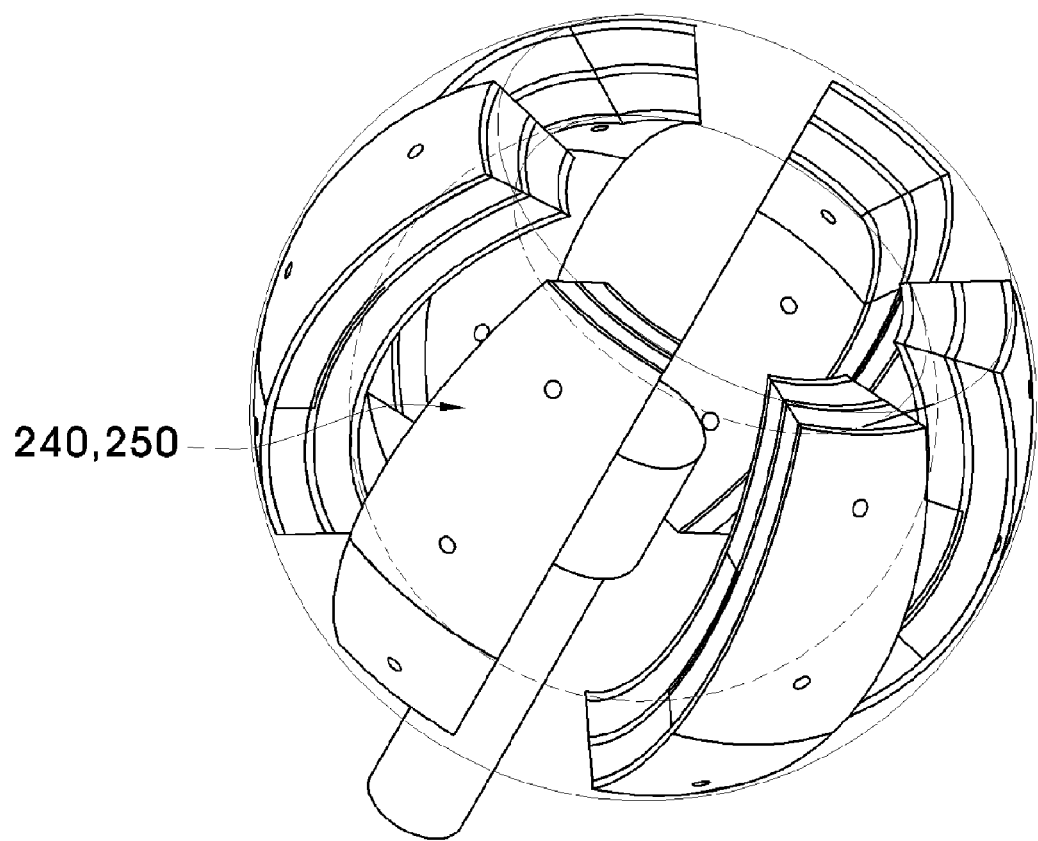
FIG. 11 is a perspective view showing a further side of the second embodiment of the spherical motor rotating in multi degrees of freedom in accordance with the present invention.
Figure 12:
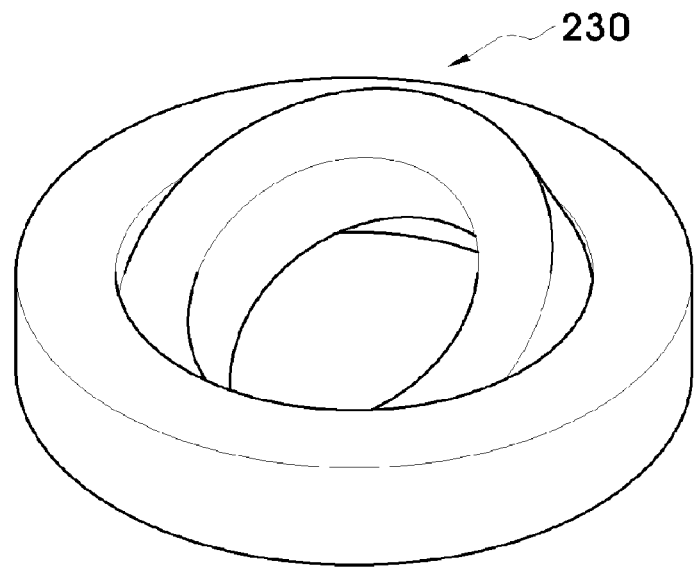
FIG. 12 is a perspective view illustrating a spherical bearing of the second embodiment of the spherical motor rotating in multi degrees of freedom in accordance with the present invention.
Figure 13:
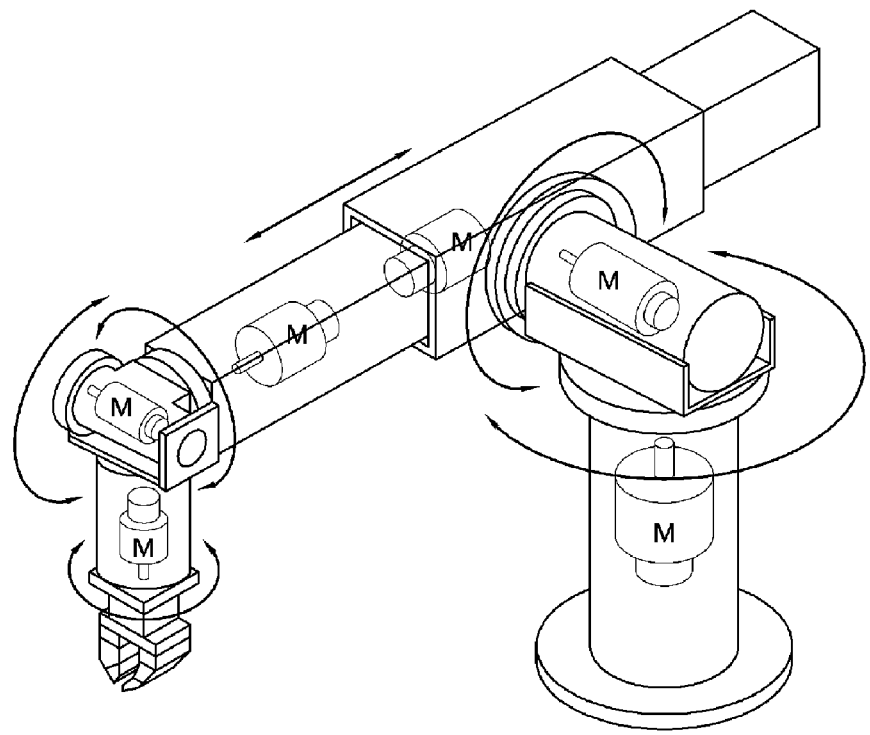
FIG. 13 is a perspective view illustrating a drive system of the prior art to realize a multi degrees of freedom movement.
Figure 14:
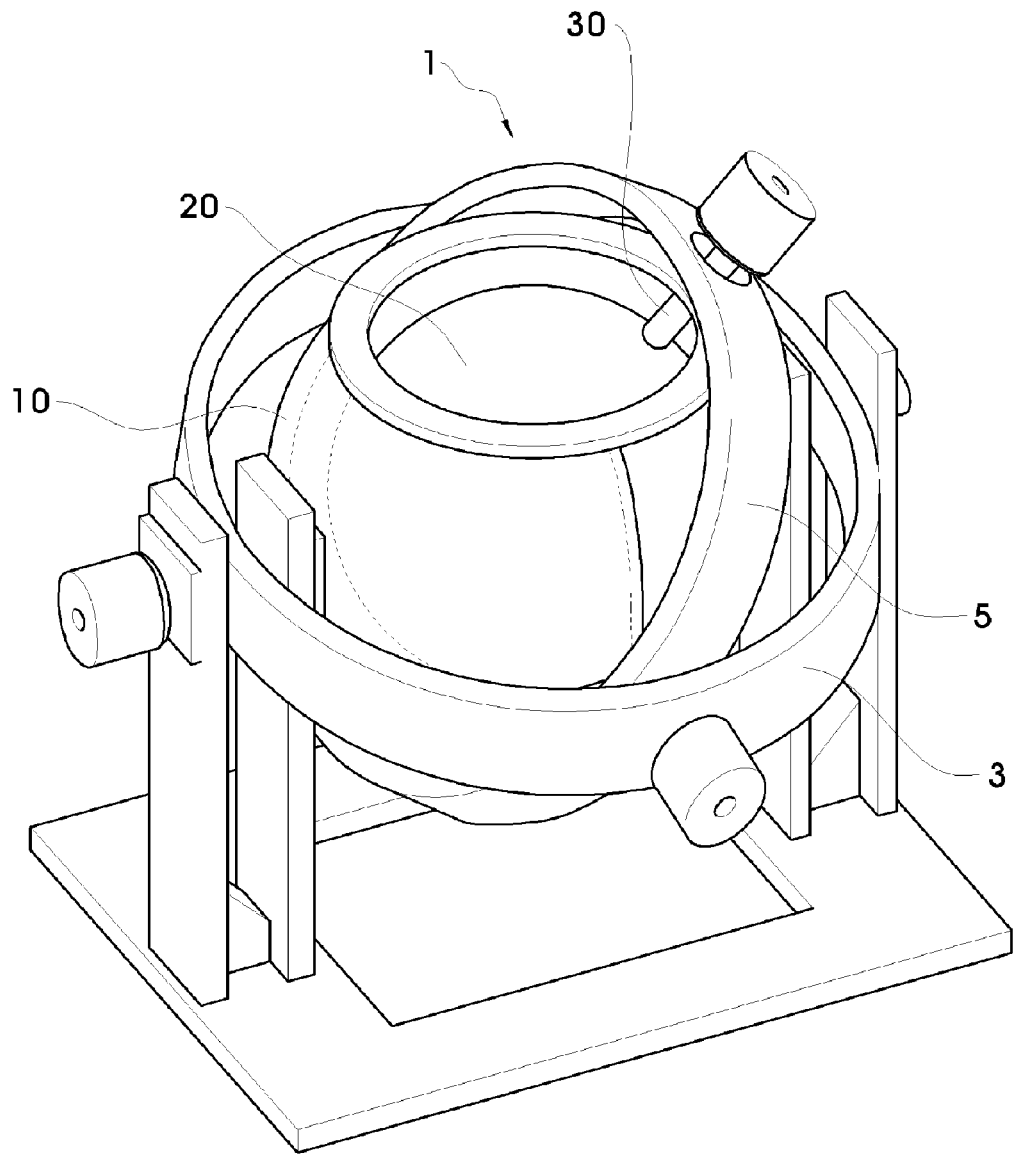
FIG. 14 is a perspective view illustrating a frame of normal spherical motor.
Figure 15:
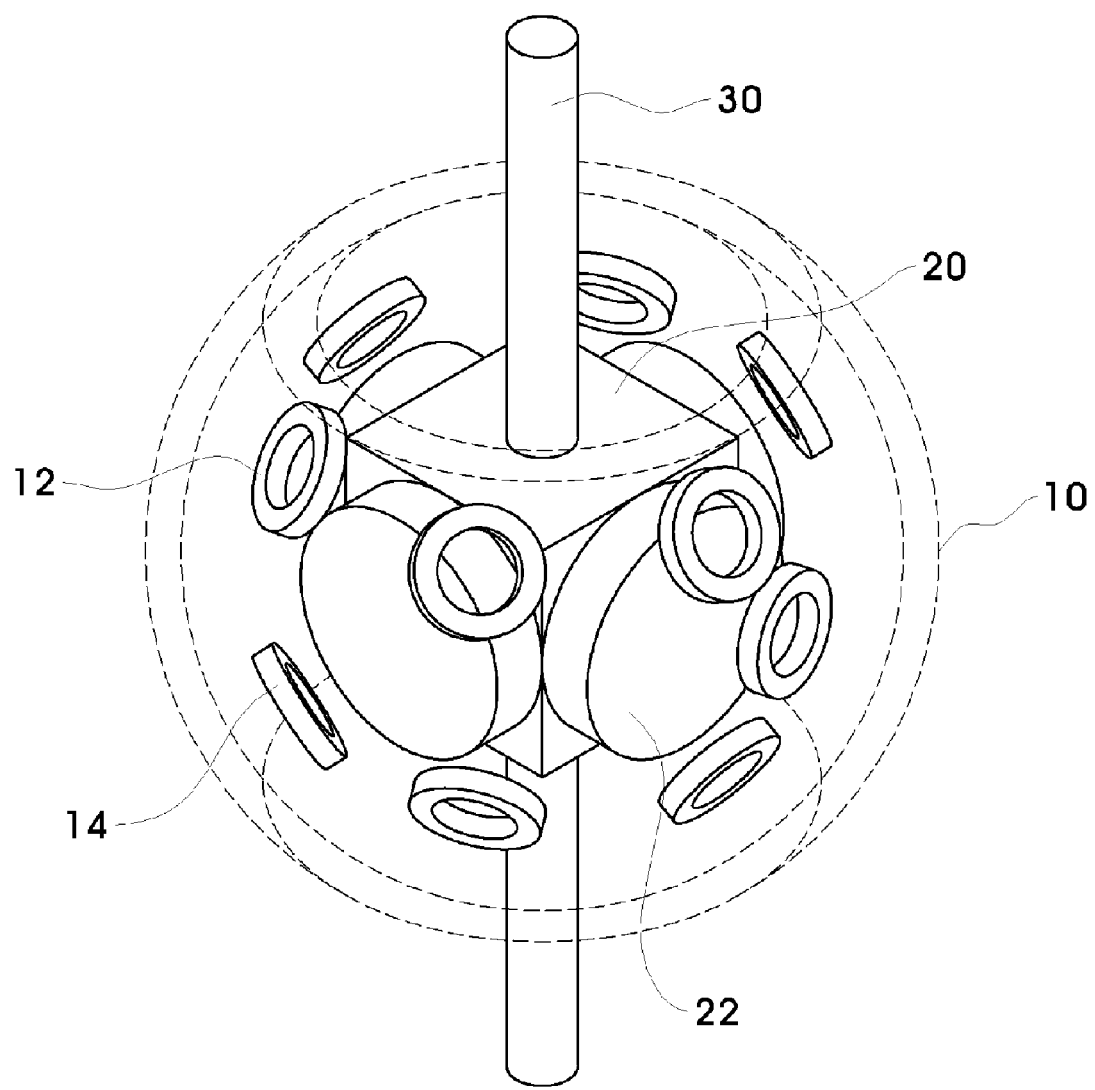
FIG. 15 is a perspective view illustrating the coil and the rotor of the normal spherical motor.
Figure 16:
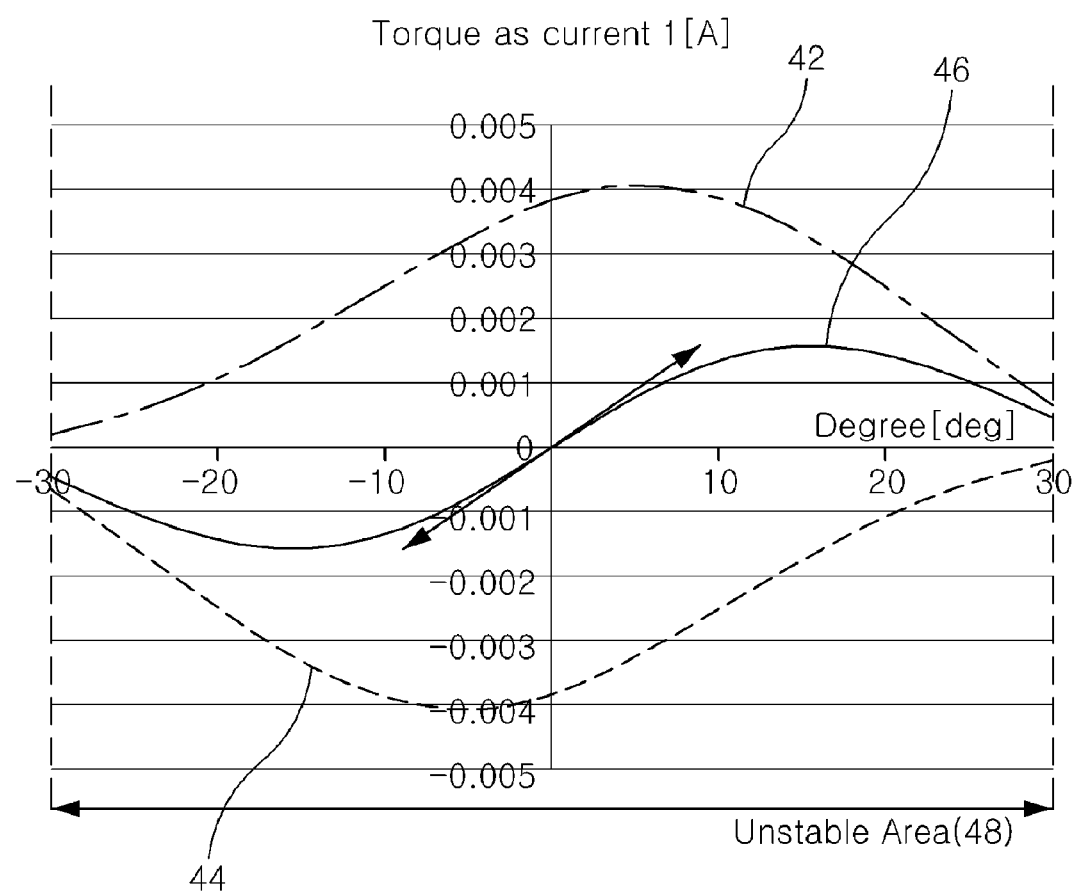
FIG. 16 is a diagram showing the resultant torques by the synthesized magneto-motive force between the coil and the permanent magnet of the normal.
Figure 17:
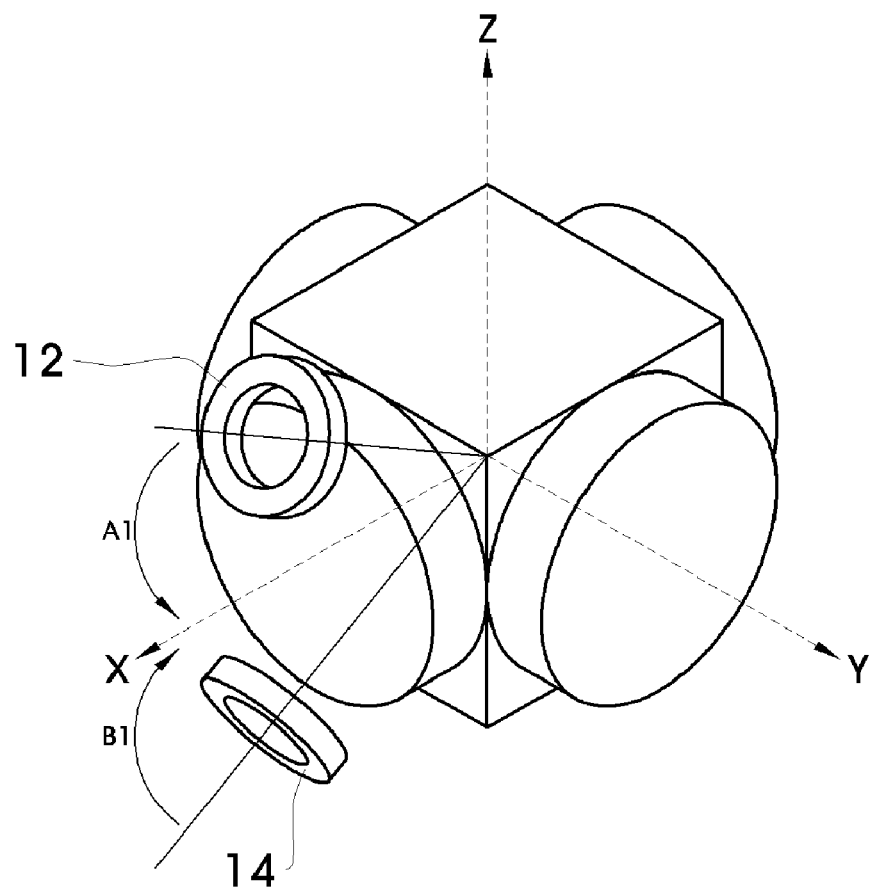
FIG. 17 is a perspective view illustrating the permanent magnets of the rotor and some parts of the coils in order to describe the generation principle of the synthesized magneto-motive force in the normal spherical motor.
Figure 18:
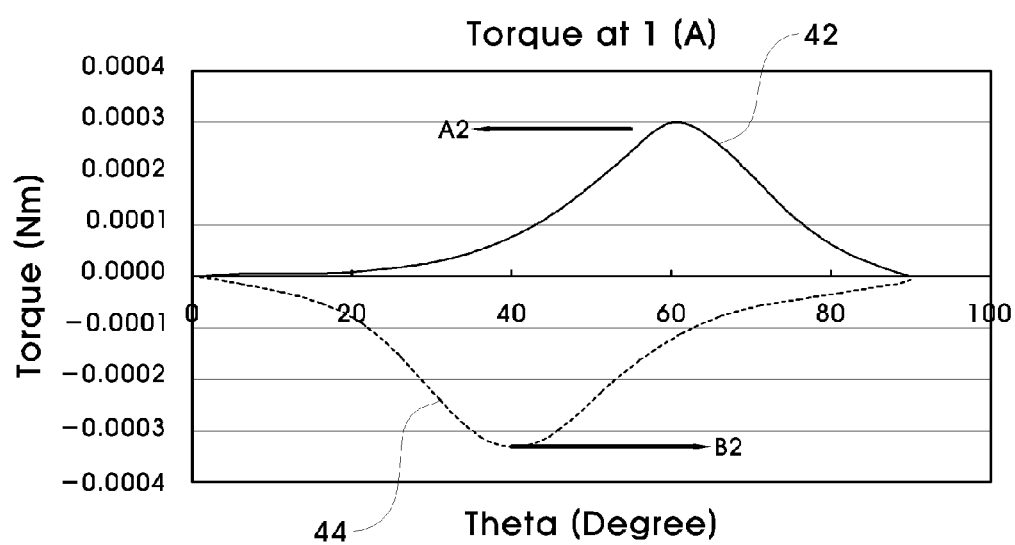
FIG. 18 is a diagram showing the changes of the resultant torque by the synthesized magneto-motive force according to the coil position of the normal spherical motor.

FIG. 8 is a perspective view illustrating a second embodiment of the spherical motor rotating in multi degrees of freedom in accordance with the present invention, and FIGS. 9 to 11 are perspective views from the various sides of the second embodiment of the spherical motor rotating in multi degrees of freedom in accordance with the present invention. And, FIG. 12 is a perspective view illustrating a spherical bearing of the second embodiment of the spherical motor rotating in multi degrees of freedom in accordance with the present invention.

The spherical motor rotating in multi degrees of freedom 200 in accordance with the present invention includes a stator 210 coupled with bi-level bobbins 240 and 250 wound by coils generating a synthesized magneto-motive force; and the rotor 220 formed inside the stator 210 and rotating around the shaft 224 the slope of which can be adjusted by the synthesized magneto-motive force.

A plurality of by-level bobbins 240 and 250 are dispersed on the inner surface of the stator 110, and are dispersed at regular intervals along the inner surface of the stator 110. As illustrated in the diagram, the bi-level bobbins 240 and 250 are located every 60 degrees along the spherical bearings 230 which will be described below. However, the bi-level bobbins 240 and 250 are not limited as mentioned above, and the number of the bi-level bobbins 240 and 250 can be increased by 12 and more than 24 according to the user's needs and the manufacturer's intention. As aforesaid, their intervals will be narrower when the numbers of the bi-level bobbins 240 and 250 are increased.

The rotor 220 is formed as one body with the rotor core 222, the shaft 224, and the back yoke 226, and four permanent magnets 227 and 228 respectively attached on the rotor core 222. At this time, two of them are south poles 227 and the rest of them are north poles 228 among the four permanent magnets 227 and 228.

The spherical bearing 230 is prepared at the center of the stator 210, as a means for rotatably coupling the rotor 220 inside the stator 210 and for generating a restoring force (binding power) to locate the rotor 220 at the center of the stator 210.

Since the spherical motor rotating in multi degrees of freedom 200 formed with the above mentioned structures in accordance with the present invention is formed with double air gaps 260 between the stator 210 and the rotor 220, the happening of the high temperature at the core of the stator 210 due to an eddy current generated at the core of the stator 210 or the reduced efficiency of the motor due to eddy current braking power can be prevented. Moreover, the back yoke 226 is prepared to rotate together with the electromagnetic stimulus of the rotor 220 and it will efficiently reduce an eddy current by controlling the time changes of the magnetic flux from the rotor 220.

Furthermore, the stability with the same level as the user's needs can be secured by adjusting the turns of the winding coil around the bi-level bobbin 240 and 250 when the bi-level bobbins 240 and 250 are used in order to make an electrical stimulus to the stator 210 as above mentioned.

A regular pattern (not illustrated) can be inserted in the back yoke 226 so as to easily determine the optical positioning information. The stator 210 and the rotor 220 can be made of a nonmagnetic substance.

While the structures and the movements of spherical motor rotating in multi degrees of freedom have been described with accompanying description and the diagrams in accordance with the preferred embodiments of the present invention, it is not to be limited thereto but will be defined by the appended claims and it is to be appreciated that those skilled in the art can substitute, change or modify the embodiments in various forms without departing from the scope and spirit of the present invention.

What is claimed is:

1. A spherical motor rotating in multi degrees of freedom, comprising:
   a hollow spherical-shaped stator installed with at least one bi-level bobbin wound by coil generating a synthesized magneto-motive force on an inner surface thereof; and
   a rotor formed inside the stator and rotating around a shaft, wherein a slope of the shaft is adjusted by the synthesized magneto-motive force,
   wherein the bobbin includes a first bobbin segment and a second bobbin segment formed with an inner layer winding member and an outer layer winding segment, respectively, wherein the outer layer winding member of the first bobbin segment is longer than the inner layer winding member, the inner layer winding member of the second bobbin segment is formed longer than the outer layer winding member, and the first bobbin segment and the second bobbin segment are allowed to be piled up one on another.

2. The spherical motor rotating in multi degrees of freedom according to claim 1, wherein the at least one bobbin comprises a plurality of bobbins that are dispersed at regular intervals along the inner surface of the stator.

3. The spherical motor rotating in multi degrees of freedom according to claim 1, wherein a center of the magneto-motive force is altered by changing turns of the winding coil on the first level and turns of the winding coil on the second level.

4. The spherical motor rotating in multi degrees of freedom according to claim 3, wherein the center of the magneto-motive force by the coil wound on the first level and the center of the magneto-motive force by the coil wound on the second level do not exceed a critical angle.

5. The spherical motor rotating in multi degrees of freedom according to claim 1, wherein coupling members having a corresponding shape are arranged between the inner layer winding member and the outer layer winding member of the first bobbin segment and between the inner layer winding member and the outer layer winding member of the second bobbin segment, respectively.

6. The spherical motor rotating in multi degrees of freedom according to claim 5, wherein a guide is formed in a longitudinal direction of the coupling members.

7. The spherical motor rotating in multi degrees of freedom according to claim 6, wherein a portion of the stator is opened to allow the shaft to incline in any direction.

8. The spherical motor rotating in multi degrees of freedom according to claim 1, wherein double air gaps are formed between the stator and the rotor, and a back yoke coupled in one body with the rotor via the shaft is prepared to cover the stator.

9. The spherical motor rotating in multi degrees of freedom according to claim 8, wherein a spherical bearing is formed inside the shaft.

10. The spherical motor rotating in multi degrees of freedom according to claim 8, wherein a pattern for determining optical positioning information is inserted in the back yoke.

11. The spherical motor rotating in multi degrees of freedom according to claim 8, wherein the stator and the rotor are composed of a nonmagnetic substance.

12. The spherical motor rotating in multi degrees of freedom according to claim 8, wherein the at least one bobbin comprises a plurality of bobbins that are dispersed at regular intervals along the inner surface of the stator.

13. The spherical motor rotating in multi degrees of freedom according to claim 8, wherein a center of the magneto-motive force is altered by changing turns of the winding coil on the first level and turns of the winding coil on the second level.

14. The spherical motor rotating in multi degrees of freedom according to claim 8, wherein a center of the magneto-motive force by the coil wound on the first level and a center of the magneto-motive force by the coil wound on the second level do not exceed a critical angle.

15. The spherical motor rotating in multi degrees of freedom according to claim 8, wherein coupling members with a corresponding shape are arranged between the inner layer winding member and the outer layer winding member of the first bobbin segment and between the inner layer winding member and the outer layer winding member of the second bobbin segment, respectively.

16. The spherical motor rotating in multi degrees of freedom according to claim 8, wherein a guide is formed in a longitudinal direction of the coupling members.

17. The spherical motor rotating in multi degrees of freedom according to claim 8, wherein a portion of the stator is opened to allow the shaft to incline in any direction.

* * * * *

UNITED STATES PATENT AND TRADEMARK OFFICE
CERTIFICATE OF CORRECTION

PATENT NO. : 8,080,911 B2
APPLICATION NO. : 12/252712
DATED : December 20, 2011
INVENTOR(S) : Sung Hong Won and Dong Woo Kang and Ju Lee It is certified that error appears in the above-identified patent and that said Letters Patent is hereby corrected as shown below:

Front page, (73) Assignee:
Delete "ICUF-HYU"
Insert --IUCF-HYU--

Signed and Sealed this
Twelfth Day of March, 2013

Teresa Stanek Rea
*Acting Director of the United States Patent and Trademark Office*